United States Patent [19]

Kunze et al.

[11] 4,077,702

[45] Mar. 7, 1978

[54] SPLICING ELEMENT FOR CONNECTION OF INDIVIDUAL LIGHT WAVEGUIDES

[75] Inventors: Dieter Kunze, Neuried; Horst-Wolfgang Wolf, Munich; Richard Parstorfer, Germering, all of Germany

[73] Assignee: Siemens Aktiengesellschaft, Berlin & Munich, Germany

[21] Appl. No.: 698,785

[22] Filed: Jun. 22, 1976

[30] Foreign Application Priority Data

Jul. 21, 1975 Germany ............... 7523185[U]
Jul. 21, 1975 Germany ............... 7523186[U]

[51] Int. Cl.$^2$ ............................................. G02B 5/14
[52] U.S. Cl. ............................................. 350/96.21
[58] Field of Search ................................. 350/96 C

[56] References Cited

U.S. PATENT DOCUMENTS

| 3,768,146 | 10/1973 | Braun et al. | 350/96 C X |
| 3,864,018 | 2/1975 | Miller | 350/96 C |
| 3,928,102 | 12/1975 | Rowe et al. | 350/96 C |

OTHER PUBLICATIONS

Dakas, M. L., Bridger A., "Plug-in Fibre-to-Fibre Coupler," Electronic Letters, July 11, 1974, vol. 10, No. 14, pp. 280-281.

*Primary Examiner*—John K. Corbin
*Assistant Examiner*—Rolf Hille
*Attorney, Agent, or Firm*—Hill, Gross, Simpson, Van Santen, Steadman, Chiara & Simpson

[57] ABSTRACT

A splicing element particularly useful for interconnecting the ends of a pair of light waveguides, such as optical fibers, in light transmitting relationship characterized by a single member, which is either molded or formed from a sheet of material, having a pair of thin wall portions with the inner surfaces inclined to each other at an acute angle to form a centering groove having a V-shape and extending longitudinally in the member for receiving and positioning the ends of the light waveguides. In one embodiment, a base of the centering groove terminates inward from each end of the member which ends have outwardly diverging surfaces to enable engaging a covering or sheathing on the waveguide. The base of the groove may have a constant depth or be concavely-shaped with the lowest point being between the ends of the groove and at the point of contact between the ends of the fibers. In one embodiment, the centering groove terminates in second wall portions which extend parallel to each other and form an aligning groove which second wall portions terminate in diverging outwardly flared third wall portions that form an insertion aid. The fibers can be held in the centering groove either by the use of a cement, by welding or the splicing element may be deformed and crimped to mechanically hold the waveguides in the connecting position.

8 Claims, 6 Drawing Figures

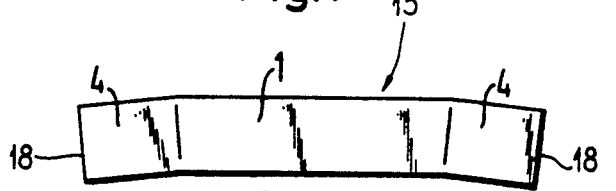
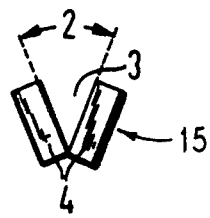
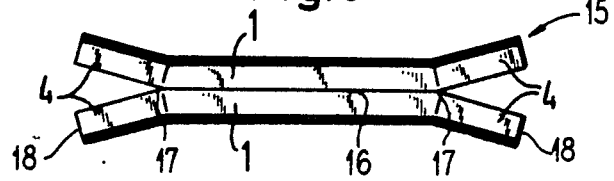
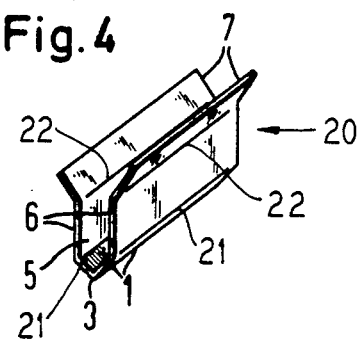

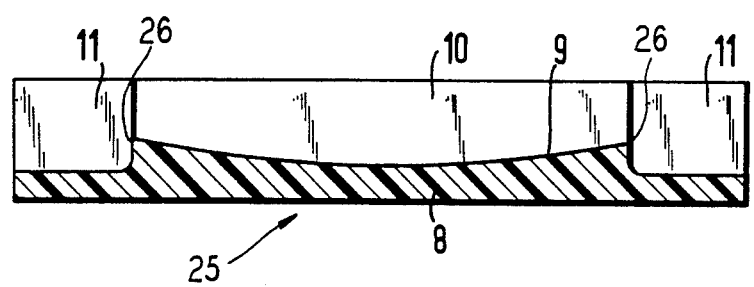
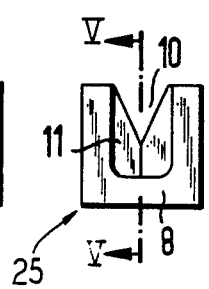

SPLICING ELEMENT FOR CONNECTION OF INDIVIDUAL LIGHT WAVEGUIDES

BACKGROUND OF THE INVENTION

Field of the Invention

The present invention is directed to a splicing element for forming undetachable end-to-end connection between individual light waveguides.

Prior Art

Since the aligning and centering of individual waveguides such as optical fibers requires precise and expensive devices due to the small diameters of the waveguides, the connection of individual light waveguides with one another is generally quite difficult to accomplish. In German Offenlegungsschrift 2,237,444, a process for coupling optical component parts is described. In this process, the component parts are fastened on carrier bodies or members which are subsequently aligned to one another.

For the centering of individual light waveguide devices, it has also been suggested to provide precision drilled bores or holes into which the individual light waveguides are introduced. In U.S. Pat. No. 3,870,395, which corresponds to Offenlegungsschrift 2,233,916, a connecting plug comprising a capillary tube into which the light waveguides such as optical fibers are inserted is dislosed. It has also been suggested that the guiding of individual light waveguides can be accomplished by using V-shaped grooves as dislosed in Canadian Patent No. 969,744.

SUMMARY OF THE INVENTION

The present invention is directed to providing a connecting device or splicing element which distinguishes itself by having an uncomplicated and simple structure, which has small space requirements, and which is especially suited for forming splicing connection which are accomplished without large adjustment expenses.

To accomplish these tasks, the present invention provides a splicing element for undetachably connecting one end of a light waveguide to an end of another light waveguide in a light transmitting relationship comprising a single member having a pair of thin wall portions, each portion of said pair having a surface inclined to the surface of the other portion of the pair at an acute angle to form a centering groove having a V-shape and extending longitudinally in said member for receiving and positioning the ends of the light waveguides to be connected together. Since the waveguides during their insertion into the centering groove will be self-aligned to a common axis, the special advantage of the embodiments of the present invention are the fact that no expensive measurement or centering devices are required to obtain the centering of the ends of the individual light waveguides which are being interconnected by the splicing element. To this end, it is desirable that the V-shaped centering groove have a base with a radius of curvature which is smaller than one-half the diameter of the individual light waveguides. Thus, the embodiments of the splicing element of the present invention may be easily manufactured by bending a thin wall sheet of material, for example a sheet of metal or a synthetic material foil, so that the resulting bend, which forms the centering groove, has a desired radius of curvature which is less than one-half of the diameter of the optical fibers forming the waveguide being inserted therein.

In forming the splice, the two waveguides, such as optical fibers, preferably have their ends properly squared. The two waveguides are inserted into the splicing element at an angle to the base of the centering groove and then moved until the ends are in contact with each other. Further movement of the waveguides toward each other will cause the fibers to then engage the base of the groove and the fibers are subsequently secured therein either by use of an adhesive such as a cement, by welding the fibers together, or by subsequently deforming the splicing element to crimp the element onto the fibers to hold them in the connected relationship.

In one embodiment of the invention, the base of the V-shaped groove is preferably formed with a concavely-arched configuration along the length of the groove with the lowest point being disposed between the ends of the groove and at the point of contact of the ends of the individual waveguides to be joined. In such an embodiment, the concavely-arched base of the groove causes the fibers to be in a curved configuration that results in a forced component urging the free ends of the fibers into the groove towards the base thereof. If an adhesive such as the glue or cement as a result of its surface tension tends to raise the ends of the individual light waveguides from the base, the forced component very advantageously urges the ends back toward the base of the groove.

In another embodiment of the present invention, the ends of the V-shaped groove terminate inward from the ends of the single member which has end portions which extend from the wall portion and diverge laterally outwardly in a flared configuration. These end portions enable insertion of a waveguide such as optical fibers which have had a portion of their protective sheathing or covering strip therefrom and enable receiving a portion of the covered fiber and engaging it to reduce tensions on the connection between the ends of the fibers.

In a third embodiment of the invention, the splicing element is formed of a sheet of material with multiple bends so that each of the thin wall portions forming the centering grooves have first extensions which extend parallel to each other and terminate in second longitudinal extensions which diverge outwardly so that the first extensions form an aligning groove adjacent the centering groove and the second extensions form an insertion aid to facilitate inserting the ends of the waveguides into the aligning groove and then subsequently into the centering groove.

BRIEF DESCRIPTION OF THE DRAWINGS

FIG. 1 is a side view of a splicing element in accordance with the present invention;

FIG. 2 is an end view of the splicing element illustrated in FIG. 1;

FIG. 3 is a plan view of a splicing element of FIG. 1;

FIG. 4 is a perspective view of an embodiment of the splicing element in accordance with the present invention;

FIG. 5 is a cross-sectional view taken along lines V—V of FIG. 6 and is a second embodiment of the splicing element in accordance with the present invention; and FIG. 6 is an end view of the embodiment of the splicing element illustrated in FIG. 5.

DESCRIPTION OF THE PREFERRED EMBODIMENTS

The principles of the present invention are particularly useful in a splicing element generally indicated at 15 in FIGS. 1, 2 and 3. The splicing element is particularly useful for connecting light waveguides, which have a circular cross section, in an end-to-end light transmitting relationship.

The splicing element 15 comprises a single member such as either a thin sheet of metal or a thin synthetic plastic foil which is folded on a bend line 16 to form a pair of wall portions 1, 1. The pair of wall portions 1, 1 have inner surfaces which are inclined at an acute angle 2 to each other to form a longitudinally extending centering groove 3 which has a V-shape with the bend line 16 being the base of the groove. The base of the groove 3 has a radius of the curvature which is less than the radius of the circular waveguide or less than one-half of the diameter of the waveguides.

In the embodiment of splicing element 15, the bend line 16 has been cut adjacent both ends 18, 18 of the element 15 so that the bend line 16 terminates at points 17, 17 (FIG. 3) which are inwardly spaced from the ends 18 of the element 15. Due to the cutting of the bend line to the points 17, each of the side wall portions 1 have end portions 4 which, as best illustrated in FIG. 3, are divergently bent laterally outward. These end portions 4 serve to receive the individual waveguides having a protective sheathing or covering. After the ends of the individual light waveguides, whose end portions have been freed or stripped of their protective sheathing, have been brought into contact with each other, the surfaces of the end portions 4 may be connected to the sheathing on the waveguide such as by cementing. By engaging and attaching the end portions 4 to the sheathing or the covering, a portion of any tension placed on the point of connection between the two individual waveguides is applied to the sheathing to minimize the amount of longitudinally directed tension that is being placed on the connection between the waveguides.

To use the splicing element 15, each of the waveguides such as optical fibers have their protective sheathing or covering stripped therefrom for a distance which is slightly greater than one-half of the length of the bend line 16. After the end of each waveguide has been properly squared, the ends are inserted into the groove 3 preferably at an angle to the bend line 16 and then moved toward each other until contact is obtained. After contact between the end faces of the two waveguides is obtained, continual relative movement of the splicing element 15 and the waveguides cause the waveguides to lie axially aligned in the groove 3 and due to the removal of the covering or sheathing, the portion in the groove 3 does not have any of the sheathing or cladding. Preferably, as mentioned above, the sheathing or covering has only been stripped from a portion adjacent the end so that the sheathing will be engaged by the end portions 4. Subsequent to insertion of the waveguides in the splicing element 15, they are secured in a connected relationship either by applying an adhesive or by crimping or deforming the splicing element into gripping engagement. If an adhesive is used, it can act as an immersion fluid between the two end faces of the fibers.

An embodiment of the splicing element in accordance with the present invention is generally indicated at 20 in FIG. 4. In the splicing element 20, the centering groove 3 extends the complete longitudinal length of the element and therefore is only suited for receiving an end of each individual light waveguide which has had the protective sheathing or coating removed therefrom.

In the embodiment 20, the sheet of material in addition to the bend line 16 has a pair of bend lines 21, 21 and a pair of bend lines 22, 22. Each of the bend lines 21 separates the wall portion 1 from a second wall portion 6. Each of the bend lines 22 separates each of the second wall portions 6 from a third wall portion 7. The pair of second wall portions 6 extend parallel to each other and form an aligning groove or portion 5 that overlies the centering groove 3. The third wall portions 7 extend or diverge outwardly to form an insertion aid. Thus, the element 20 has a cross section configuration of a V-shaped groove with a parallel extending second portion 6 that terminates in outwardly extending third portions 7. The insertion aid formed by the portion 7 assists in inserting the ends of the light waveguides into the aligning groove 5 which facilitates aligning the axes of each of the waveguides such as optical fibers to a common longitudinal axis as they are lowered into the centering groove 3.

While both of the embodiments of the splicing element 15 and 20 are preferably since piece of sheet material such as either sheet metal or a thin synthetic plastic foil which is bent on the various bend lines to form the various wall portions, both embodiments can also be produced by molding a material into the splicing element with the thin wall portions.

A third embodiment of the splicing element in accordance with the present invention is generally indicated at 25 in FIGS. 5 and 6. The element 25 has a centering groove 10 which has a V-shape and extending longitudinally along the element. As illustrated, the groove 10 has a base 9 and terminates inward of the ends of the element 25 such as at points 26, 26. As illustrated in FIGS. 5 and 6, portions or extensions 11 extending from the points 26 to the end of the element 25 have diverging outward extending surfaces so that waveguide with protective sheathing or coating can be received and engaged by the surfaces of the portions 11.

The base 9, as best illustrated in FIG. 5, between the ends 26, 26, has a concavely-arched configuration with the lowest point of the arch being substantially midway between the points 26, 26 and preferably at the point of contact between the ends of the two waveguides being interconnected. Thus, as the waveguides are inserted in the groove 10, and have their end faces in contact with each other, they are in a slightly curved condition which creates a forced component that tends to hold them closely to the base line 9 and opposes any lifting force caused by an adhesive used to secure the waveguides in the element 25.

The embodiment 25 may be advantageously produced from a synthetic material by utilizing injecting molding process. In addition, the device 25 may be molded out of other materials, for example metal as well as glass or ceramic materials. As pointed out hereinabove, the individual light waveguides are preferably secured within the element 25 by a suitable adhesive such as cement which will simultaneously serve as an immersion substance.

If the element 25 is formed of a deformable material, a mechanical gripping of the ends of the individual light waveguides while in the centering groove may be accomplished by squeezing the thin walls forming the groove 10 into tight gripping engagement on the inserted aligned fibers.

Although various minor modifications might be suggested by those versed in the art, it should be understood that we wish to employ within the scope of the patent warranted hereon, all such modifications as reasonably and properly come within the scope of our contribution to the art.

We claim:

1. A splicing element for undetachably connecting an end of one light waveguide to an end of another light waveguide in a light transmitting relationship, comprising a single member having a pair of thin wall portions, each portion of said pair having a surface inclined to the surface of the other portion of the pair at an actute angle to form a centering groove having a V-shape and extending longitudinally in said member for receiving and positioning the ends of the light waveguides to be connected together, said pair of wall portions having first extensions extending parallel to each other and terminating in second longitudinal extensions which diverge outwardly so that the first extension forms an aligning groove adjacent the centering groove and said second extension forms an insertion aid to facilitate insertion of the waveguides into the aligning groove and then into the centering groove.

2. A splicing element according to claim 1, wherein the single member is a single sheet of material, wherein each of the waveguides has a circular cross section, and wherein a base of the centering groove has a radius of curvature smaller than one-half the diameter of the individual light waveguides being connected therein.

3. A splicing element for undetachably connecting an end of one light waveguide to an end of another light waveguide in a light transmitting relationship, comprising a single member having a pair of thin wall portions, each portion of said pair having a surface inclined to the surface of the other portion of the pair at an acute angle to form a centering groove having a V-shape with a base and extending longitudinally in said member for receiving and positioning the ends of the light waveguides to be connected together, each end of the base of the centering groove terminating inward from each end of the member and each end of the single member having end portions diverging laterally outward so that the end portions engage a covering of the light waveguide.

4. A splicing element according to claim 3, wherein each of the waveguides has a circular cross section, and wherein the base of the centering groove has a radius of curvature smaller than one-half of the diameter of the individual light waveguides being connected therein.

5. A splicing element according to claim 4, wherein the single member is a single sheet of material, and wherein the end portions are part of the thin wall portions.

6. A splicing element for undetachably connecting an end of one light waveguide to an end of another light waveguide in a light transmitting relationship, comprising a single member having a pair of thin wall portions, each portion of said pair having a surface inclined to the surface of the outer portion of the pair at an acute angle to form a centering groove having a base and a V-shape and extending longitudinally in said member for receiving and positioning the ends of the light waveguides to be connected together, said base of the centering groove having a concavely-arching along the length of the groove with the lowest point being disposed between the ends of the groove and at a point of contact of the ends of the individual waveguides to be connected thereby.

7. A splicing element according to claim 6, wherein each of the waveguides has a circular cross section and wherein the base of the groove has a radius of curvature smaller than one-half of the diameter of the individual light waveguides being inserted therein.

8. A splicing element according to claim 6, wherein the base of the centering grooves has ends terminating inward of the ends of the single member, and the member includes a pair of diverging end portions disposed between each end of the member and the end of the base of the groove so that a light waveguide having a covering can be inserted between the end portions of the splicing element and the end portions engage the covering.

* * * * *